United States Patent
Yamada et al.

(10) Patent No.: US 11,927,802 B2
(45) Date of Patent: Mar. 12, 2024

(54) OPTICAL MODULE AND METHOD FOR MANUFACTURING OPTICAL MODULE

(71) Applicant: SUMITOMO ELECTRIC INDUSTRIES, LTD., Osaka (JP)

(72) Inventors: Eiichiro Yamada, Osaka (JP); Takafumi Ohtsuka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 242 days.

(21) Appl. No.: 17/284,376

(22) PCT Filed: Oct. 10, 2019

(86) PCT No.: PCT/JP2019/040081
§ 371 (c)(1),
(2) Date: Apr. 9, 2021

(87) PCT Pub. No.: WO2020/080254
PCT Pub. Date: Apr. 23, 2020

(65) Prior Publication Data
US 2021/0389525 A1    Dec. 16, 2021

(30) Foreign Application Priority Data
Oct. 15, 2018 (JP) ................................ 2018-194323

(51) Int. Cl.
*G02B 6/255* (2006.01)
*G02B 6/02* (2006.01)

(52) U.S. Cl.
CPC ....... *G02B 6/2552* (2013.01); *G02B 6/02042* (2013.01)

(58) Field of Classification Search
CPC .... G02B 27/30; G02B 6/02042; G02B 6/264; G02B 6/2821
See application file for complete search history.

(56) References Cited

U.S. PATENT DOCUMENTS

2019/0115715 A1\* 4/2019 Hasegawa ............. H01S 3/0941
2019/0207358 A1    7/2019 Hasegawa et al.
2019/0379175 A1\* 12/2019 Shimakawa ........ H01S 3/06708

FOREIGN PATENT DOCUMENTS

JP    H04-073609 A    3/1992
JP    2010-286718 A   12/2010
(Continued)

OTHER PUBLICATIONS

Dec. 3, 2019 International Search Report issued in International Patent Application No. PCT/JP2019/040081.

*Primary Examiner* — Eric Wong
(74) *Attorney, Agent, or Firm* — Oliff PLC

(57) ABSTRACT

An optical module according to an embodiment includes a first optical component and a second optical component including a multicore fiber (MCF) and a spatial joining part. The first optical component includes a first uncoupled MCF having small optical coupling between cores and a first coupled MCF having a mode field diameter (MFD) larger than a MFD of the first uncoupled MCF. The second optical component includes a second uncoupled MCF having small optical coupling between cores and a second coupled MCF having a MFD larger than a MFD of the second uncoupled MCF. In the first coupled MCF and the second coupled MCF, crosstalk is periodically produced along the length direction of an MCF, and the total of the length of the first coupled MCF and the length of the second coupled MCF is a length L in which crosstalk is suppressed.

7 Claims, 14 Drawing Sheets

(56) References Cited

FOREIGN PATENT DOCUMENTS

| JP | 2014-503081 A | 2/2014 | |
|---|---|---|---|
| JP | 2014-522997 A | 9/2014 | |
| JP | 2016-033642 A | 3/2016 | |
| JP | 2016-0336426 A | 3/2016 | |
| WO | 2012/088361 A2 | 6/2012 | |
| WO | 2012/177808 A1 | 12/2012 | |
| WO | WO-2017195834 A1 * | 11/2017 | ......... G02B 6/02042 |
| WO | 2018/047867 A1 | 3/2018 | |
| WO | WO-2022054536 A1 * | 3/2022 | |

* cited by examiner

OPTICAL MODULE AND METHOD FOR MANUFACTURING OPTICAL MODULE

TECHNICAL FIELD

An aspect of the present disclosure relates to an optical module and a method for manufacturing an optical module.

The present application claims the benefit based upon Japanese Patent Application 2018-194323 filed on Oct. 15, 2018, the entire content of which is incorporated herein by reference.

BACKGROUND ART

Patent Literature 1 describes an optical fiber ferrule terminal including a mode field conversion optical fiber. The optical fiber ferrule terminal has a core expansion region extending from the end face of an optical fiber in an optical axis direction, a core diameter transition region in which the core diameter is transitioned gradually smaller from the core expansion region, and a core region extending from the core diameter transition region to the opposite side of the core expansion region.

The core expansion region is a region in which the core diameter is expanded by heat treatment. The core expansion region is formed on the end face of the optical fiber, and thus the light intensity profile of the optical axis in the vertical direction at the end face of the optical fiber the distribution spreads. In establishing the connection to the mode field conversion optical fiber having the core expansion region formed on the end face of the optical fiber, an increase in the tolerance of the optical axis offset in establishing connection is enabled.

CITATION LIST

Patent Literature

Patent Literature 1: Japanese Unexamined Patent Publication No. H4-73609

Summary Of Invention

An optical module according to an aspect of the present disclosure is an optical module including a first optical component and a second optical component including a multicore fiber (MCF) and a spatial joining part configured to optically couple the first optical component to the second optical component. The first optical component includes a first uncoupled MCF and a first coupled MCF, the first uncoupled MCF having small optical coupling between cores, the first coupled MCF being located between the first uncoupled MCF and the spatial joining part, the first coupled MCF having a mode field diameter (MFD) larger than a MFD of the first uncoupled MCF. The second optical component includes a second uncoupled MCF and a second coupled MCF, the second uncoupled MCF having small optical coupling between cores, the second coupled MCF being located between the second uncoupled MCF and the spatial joining part, the second coupled MCF having an MFD larger than a MFD of the second uncoupled MCF. In the first coupled MCF and the second coupled MCF, crosstalk is periodically produced along length directions of the MCFs, and a total of a length of the first coupled MCF and a length of the second coupled MCF is length L in which the crosstalk is suppressed.

A method for manufacturing an optical module according to an aspect of the present disclosure is a method for manufacturing the above-described optical module. The method for manufacturing the optical module includes the steps of: cutting an uncoupled MCF to prepare the first uncoupled MCF and the second uncoupled MCF; fusion-splicing, between the first uncoupled MCF and the second uncoupled MCF, a coupled MCF having the length L and having an MFD larger than an MFD of the uncoupled MCF; and splitting the coupled MCF to prepare the first coupled MCF and the second coupled MCF.

A method for manufacturing an optical module according to another aspect of the present disclosure is a method for manufacturing the above-described optical module. The method for manufacturing the optical module includes the steps of: heating an uncoupled MCF to prepare, between the first uncoupled MCF and the second uncoupled MCF, a coupled MCF having an MFD larger than an MFD of the uncoupled MCF; and splitting the coupled MCF to prepare the first coupled MCF and the second coupled MCF.

DESCRIPTION OF EMBODIMENTS

Figure 1:
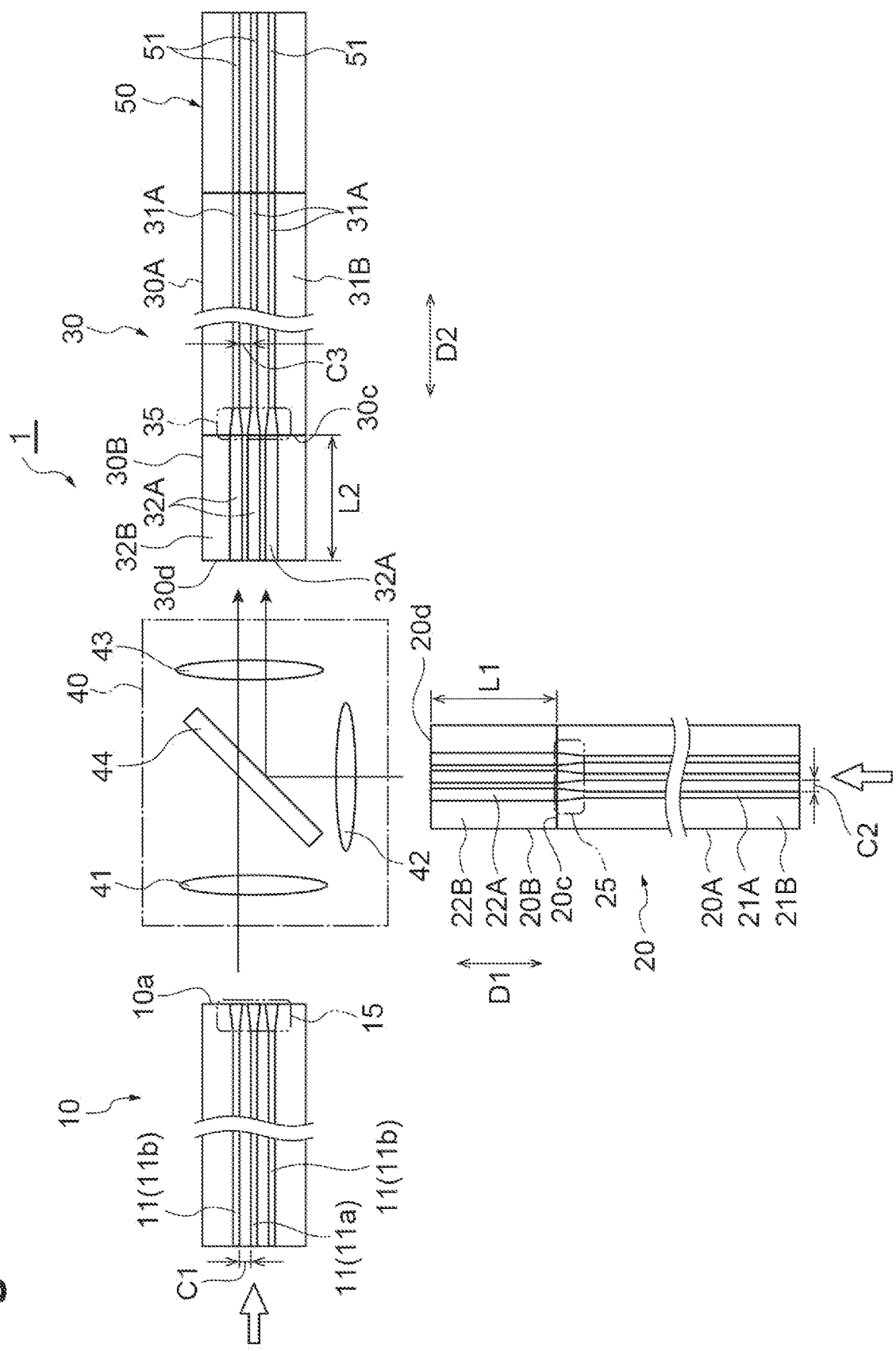
FIG. 1 is a view schematically showing the configuration of an optical module according to a first embodiment.

Meanwhile, in the case in which a multicore fiber (in the following, referred to as an "MCF") is applied to the above-described optical fiber ferrule terminal, crosstalk is possibly produced in which a light beam passing a core interferes with another core. Specifically, it is assumed that when a part having cores expanded is prepared in the MCF, the optical coupling between the cores is increased, and this causes a hindrance to optical communication.

Typically in MCF, a plurality of cores is disposed such that their center axes are apart from each other at a few tens micrometers or more. In regard to the types of the MCFs, there are a coupled MCF and an uncoupled MCF, the coupled MCF designed such that the optical coupling between the cores is increased, the uncoupled MCF designed such that the optical coupling between the cores is decreased. The uncoupled MCF is used for an optical communication module based on a premise that the crosstalk between the cores is small.

When a mode field diameter (in the following, referred to as an "MFD") is expanded by expanding the core diameter on the tip end face, for example, there is an advantage that is resistant to offsets, which enables a reduction in optical connection losses. However, in the case of the MCF, the MFD is expanded to increase the optical coupling between the cores, this causes crosstalk as described above, and bias is possibly produced in the intensity of light beams between the plurality of cores. When bias is produced in the intensity of light beams between the plurality of cores, the strengths of signals used for optical communication are varied in the individual cores, and thus a hindrance to optical communication is possibly a problem. Therefore, there is a room for improvement in the quality of optical communication.

It is an object of an aspect of the present disclosure to provide an optical module and a method for manufacturing an optical module that enable the improvement of the quality of optical communication.

According to an aspect of the present disclosure, the improvement of the quality of optical communication is enabled.

DESCRIPTION OF EMBODIMENTS

First, the content of embodiments will be described in enumeration. An optical module according to an embodiment is an optical module including a first optical component and a second optical component including a multicore fiber (MCF) and a spatial joining part configured to optically couple the first optical component to the second optical component. The first optical component includes a first uncoupled MCF and a first coupled MCF, the first uncoupled MCF having small optical coupling between cores, the first coupled MCF being located between the first uncoupled MCF and the spatial joining part, the first coupled MCF having a mode field diameter (MFD) larger than a MFD of the first uncoupled MCF. The second optical component includes a second uncoupled MCF and a second coupled MCF, the second uncoupled MCF having small optical coupling between cores, the second coupled MCF being located between the second uncoupled MCF and the spatial joining part, the second coupled MCF having an MFD larger than a MFD of the second uncoupled MCF. In the first coupled MCF and the second coupled MCF, crosstalk is periodically produced along length directions of the MCFs, and a total of a length of the first coupled MCF and a length of the second coupled MCF is length L in which the crosstalk is suppressed.

In the optical module according to an embodiment, the first optical component includes the first uncoupled MCF and the first coupled MCF, and the second optical component includes the second uncoupled MCF and the second coupled MCF. The spatial joining part optically couples the first optical component to the second optical component. The first coupled MCF is located between the first uncoupled MCF and the spatial joining part, and the second coupled MCF is located between the second uncoupled MCF and the spatial joining part. The first coupled MCF and the second coupled MCF is optically coupled to each other through the spatial joining part. In the tip end face of the first coupled MCF on the spatial joining part side and the tip end face of the second coupled MCF on the spatial joining part side, the MFDs are increased more than the MFDs of the first uncoupled MCF and the second uncoupled MCF. Therefore, it is possible to reduce optical connection losses with resistance to offsets, and it is possible to relieve manufacture tolerance in the offset direction. In the first coupled MCF and the second coupled MCF, crosstalk is periodically produced along the length direction of the MCFs. However, the total of the length of the first coupled MCF and the length of the second coupled MCF is adjusted in the length L in which the crosstalk is suppressed, and thus light emission is enabled from the optical module in the state in which the bias of the light beam among a plurality of cores is suppressed. Therefore, it is possible to suppress variations each core in the strength of the signal used for optical communication, and thus the improvement of the quality of optical communication is enabled.

In the optical module according to an embodiment, a configuration may be provided in which a core diameter of the first coupled MCF is larger than a core diameter of the first uncoupled MCF, and a core diameter of the second coupled MCF is larger than a core diameter of the second uncoupled MCF. In this case, it is possible to easily increase the MFDs of the first coupled MCF and the second coupled MCF.

In the optical module according to an embodiment, at least any one of the first coupled MCF and the second coupled MCF may have a core expansion part in which a core diameter is further expanded. In this case, in the core expansion part, the optical coupling between the cores is further increased, and thus it is possible to more easily produce crosstalk. Therefore, the length of the core expansion part of the first coupled MCF or the second coupled MCF is adjusted, and thus it is possible to easily adjust the length L in which crosstalk is suppressed.

In the optical module according to an embodiment, at least any one of the first coupled MCF and the second coupled MCF may have a diameter shrinking part in which an outer diameter is decreased by extension. In this case, in the diameter shrinking part, the optical coupling between the cores is further increased, and thus it is possible to more easily produce crosstalk. Therefore, the length of the diameter shrinking part of the first coupled MCF or the second coupled MCF is adjusted, and thus it is possible to easily adjust the length L in which crosstalk is suppressed. It is possible to easily form the diameter shrinking part by pulling the MCFs in the length direction by heating and extension, for example.

In the optical module according to an embodiment, the first coupled MCF and the second coupled MCF may have a diameter shrinking part by extension in which an outer diameter is decreased as apart from the first uncoupled MCF and the second uncoupled MCF. In this case, in the diameter shrinking part, the core diameter is decreased and the distance between the center axes of the cores is narrowed, and the optical coupling between the cores is increased, and the MFDs are increased. Accordingly, it is possible to prepare the first coupled MCF and the second coupled MCF with no increase in the type of the MCF to be prepared. It is possible to easily form the diameter shrinking part by pulling the MCF in the length direction by heating and extension, for example.

A method for manufacturing an optical module according to an embodiment is a method for manufacturing the above-described optical module. The method for manufacturing the optical module includes the steps of: cutting an uncoupled MCF to prepare the first uncoupled MCF and the second uncoupled MCF; fusion-splicing, between the first uncoupled MCF and the second uncoupled MCF, a coupled MCF having the length L and having an MFD larger than an MFD of the uncoupled MCF; and splitting the coupled MCF to prepare the first coupled MCF and the second coupled MCF.

In the method for manufacturing the optical module according to an embodiment, the uncoupled MCF is cut to prepare the first uncoupled MCF and the second uncoupled MCF, and the coupled MCF having the length L is fusion-spliced between the first uncoupled MCF and the second uncoupled MCF. The coupled MCF is then split to prepare the first coupled MCF and the second coupled MCF, and thus it is possible to easily manufacture an optical module. Therefore, it is possible to easily manufacture an optical module including the first coupled MCF and the second coupled MCF having the length L in which the crosstalk is suppressed.

A method for manufacturing an optical module according to another embodiment is a method for manufacturing the above-described optical module. The method for manufacturing the optical module includes the steps of: heating an uncoupled MCF to prepare, between the first uncoupled MCF and the second uncoupled MCF, a coupled MCF having an MFD larger than an MFD of the uncoupled MCF; and splitting the coupled MCF to prepare the first coupled MCF and the second coupled MCF.

In the method for manufacturing the optical module according to an embodiment, the uncoupled MCF is heated to prepare the coupled MCF between the first uncoupled MCF and the second uncoupled MCF. The coupled MCF is then split to prepare the first coupled MCF and the second coupled MCF, and thus it is possible to easily manufacture an optical module. Therefore, similarly to the description above, it is possible to easily manufacture an optical module including the first coupled MCF and the second coupled MCF having the length L in which the crosstalk is suppressed.

In the above-described method for manufacturing the optical module, a configuration may be provided in which in the step of preparing the coupled MCF, the uncoupled MCF is pulled to decrease an outer diameter while the uncoupled MCF is heated, and thus the MFDs are increased. In this case, the uncoupled MCF is pulled while being heated, it is possible to form the diameter shrinking part whose diameter is shrunk as apart from the first uncoupled MCF and the second uncoupled MCF. The diameter shrinking part, the core diameter is decreased and the distance between the center axes of the cores is narrowed, and the optical coupling between the cores is increased, and the MFDs are increased. Accordingly, it is possible to prepare the first coupled MCF and the second coupled MCF with no increase in the type of the MCF to be prepared.

Detail of Embodiments

Specific examples of an optical module and a method for manufacturing an optical module according to the embodiment of the present disclosure will be described with reference to the drawings. The present invention is not limited to examples below, and is intended to include all modifications described in the scope of claims and equivalent to claims. In the description of the drawings, the same or corresponding components are designated with the same reference signs, and the duplicate description is appropriately omitted. For easy understanding, a part of the drawings is sometimes simplified or exaggerated, and dimensions, ratios, and any other parameters are not limited to those described in the drawings.

First Embodiment

FIG. 1 is a view showing the schematic configuration of an optical module 1 according to a first embodiment. The optical module 1 forms an optical fiber amplifier used in an optical communication system that transmits signal light beams using a multicore fiber (MCF), for example. The optical module 1 includes a coupled MCF 10 for signal transmission, a first optical component 20 for excitation light, a second optical component 30 for signal transmission and excitation light, and a spatial joining part 40. The spatial joining part 40 optically couples the coupled MCF 10, the first optical component 20, and the second optical component 30 to one another. The spatial joining part 40 includes a collimating lens 41 opposite to the coupled MCF 10, a collimating lens 42 opposite to the first optical component 20, a collimating lens 43 opposite to the second optical component 30, and a bandpass filter 44, for example.

Figure 2:
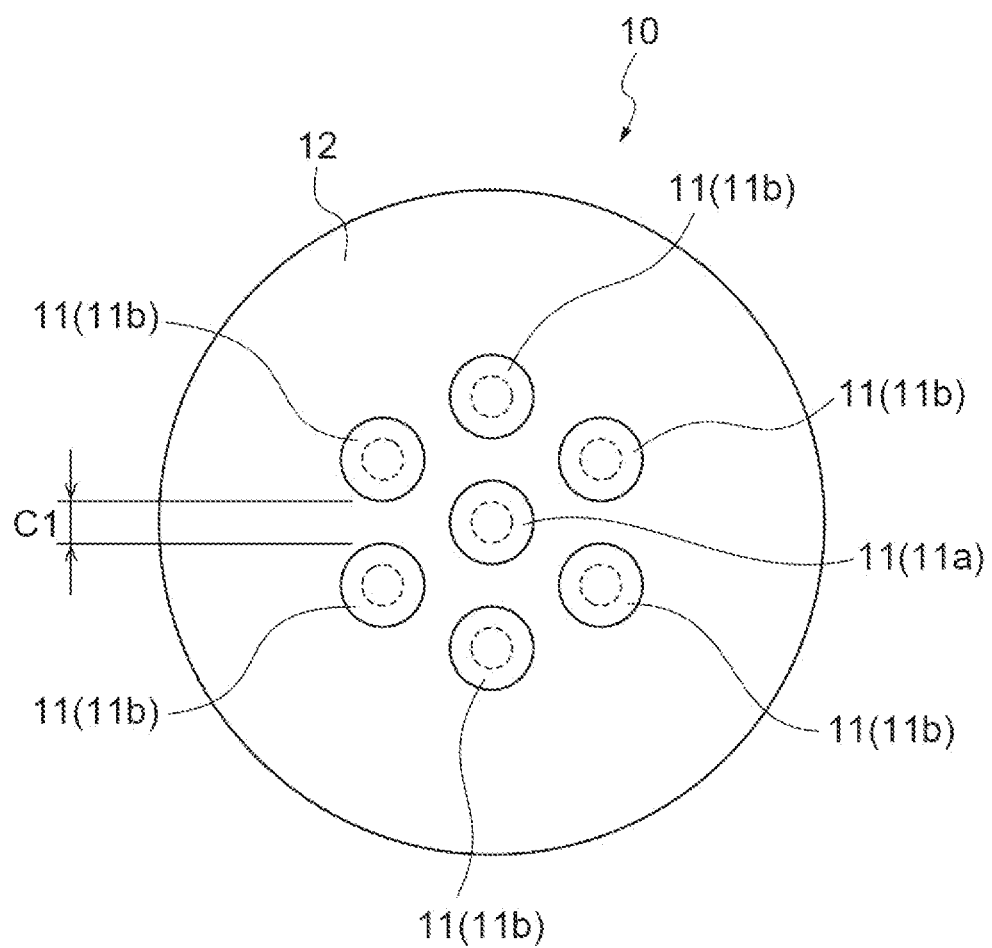
FIG. 2 is a view showing an example of the end face of the MCF of the optical module in FIG. 1.

FIG. 2 is a view of the end face of the coupled MCF 10 viewed from the long-side direction of the coupled MCF 10. As shown in FIGS. 1 and 2, the coupled MCF 10 is an MCF formed to transmit signal light beams for optical communication. The coupled MCF 10 includes a plurality of cores 11 and a cladding 12 covering the plurality of cores 11. The core 11 includes a center core 11a and a plurality of outer cores 11b disposed surrounding the center core 11a. In the coupled MCF 10, since the refractive index of the core 11 is higher than the refractive index of the cladding 12, a signal light beam propagates through each of the plurality of cores 11.

For example, the plurality of cores 11 is disposed such that the distance (the center distance) between the centers of the cores 11 is equal. In this case, the center distance between the center core 11a and each of the outer cores 11b is the same. As an example, the coupled MCF 10 is a seven-core optical fiber with seven cores 11 disposed in a triangular lattice shape in which six outer cores 11b are disposed around the center core 11a. However, the number of cores included in the coupled MCF only has to be a plural number, and the disposition of the cores 11 is appropriately changeable. The signal light beam transmitted by the coupled MCF 10 is a light beam having a wavelength of a 1.55 micrometer band, for example.

The coupled MCF 10 has an MFD converting part 15 at the end part on the spatial joining part 40 side. In the comparison with the part other than the MFD converting part 15, in the MFD converting part 15, the optical coupling between the cores is increased. Note that in the present specification, the term "the optical coupling between the cores is increased" includes the meaning that the optical coupling between the cores is increased in the case in which the diameter of the core is expanded to shorten the distance between the outer circumferences of the cores, in the case in which the distance between the center axes of the cores is decreased, or in other cases.

For example, in the MFD converting part 15, the diameters of the cores 11 are expanded as the cores 11 go toward a tip end face 10a of the coupled MCF 10, whereas a distance C1 between the outer circumferences of the cores is narrowed as the cores 11 go toward the tip end face 10a. The part at which the diameters of the cores 11 are expanded is formed by heating; the part is formed by being burnt with a burner, for example. As described above, the diameters of the cores 11 are expanded at the MFD converting part 15 including the tip end face 10a of the coupled MCF 10, and thus the MFD is expanded, and the coupled MCF 10 has a configuration resistant to offsets.

The first optical component 20 includes an MCF that transmits a pump light beam used for signal amplification. The pump light beam transmitted by the first optical component 20 is a pump light beam having a wavelength of a 0.98 micrometer band, for example. The first optical component 20 includes a first uncoupled MCF 20A having small optical coupling between the cores and a first coupled MCF 20B located between the first uncoupled MCF 20A and the spatial joining part 40.

The first uncoupled MCF 20A and the first coupled MCF 20B are fusion-spliced to each other, for example. In the first coupled MCF 20B, a core-outer-circumference-to-core-outer-circumference distance C2 is narrowed in the comparison with the first uncoupled MCF 20A. For example, in the present embodiment, the uncoupled MCFs represent MCFs whose coupling coefficient between the adjacent cores is 0.001 m$^{-1}$ or less, whereas the coupled MCFs represent MCFs whose coupling coefficient between the adjacent cores is 1 m$^{-1}$ or more.

Similarly to the description above, for example, the first uncoupled MCF 20A includes cores 21A including a center core and outer cores disposed surrounding the center core and a cladding 21B covering a plurality of cores 21A. Since the refractive index of the core 21A is higher than the refractive index of the cladding 21B, a pump light beam propagates through the inside of the cores 21A. The disposition of the plurality of cores 21A is similar to the disposition of the above-described cores 11, for example.

At the end part of the first uncoupled MCF 20A on the first coupled MCF 20B side, i.e., a fusion-spliced part of the first uncoupled MCF 20A to the first coupled MCF 20B, an MFD converting part 25 is provided. The configuration of the MFD converting part 25 may be similar to the configuration of the MFD converting part 15, for example. That is, in the MFD converting part 25, the core-outer-circumference-to-core-outer-circumference distance C2 of the core 21A is narrowed as the cores 21A go toward a tip end face 20c of the first uncoupled MCF 20A; for example, the diameters of the cores 21A are expanded as the cores 21A go toward the tip end face 20c.

Similarly to the first uncoupled MCF 20A, for example, the first coupled MCF 20B includes cores 22A including a center core and the outer cores and a cladding 22B surrounding a plurality of cores 22A. A core-outer-circumference-to-core-outer-circumference distance C2 of the cores 22A of the first coupled MCF 20B is shorter than the core-outer-circumference-to-core-outer-circumference distance C2 of the core 21A of the first uncoupled MCF 20A. The core-outer-circumference-to-core-outer-circumference distance C2 of the MFD converting part 25 is shorter as the cores 22A go from the first uncoupled MCF 20A toward the first coupled MCF 20B, for example.

The core-outer-circumference-to-core-outer-circumference distance C2 of the first coupled MCF 20B is constant along a length direction D1 of the first coupled MCF 20B (the optical axis direction of the first optical component 20). For example, at a tip end face 20d of the first coupled MCF 20B on the spatial joining part 40 side, the diameters of the cores 22A are almost the same as the diameters of the cores 21A at the part of the tip end face 20c of the MFD converting part 25. In the comparison with the core 21A of the first uncoupled MCF 20A, the diameter of the core 22A at the tip end face 20d of the first coupled MCF 20B is expanded, and thus the MFD is increased, and the first optical component 20 has a configuration resistant to offsets.

The second optical component 30 is optically coupled to an amplification uncoupled MCF 50 that amplifies a signal light beam, for example, on the opposite side of the spatial joining part 40. The first optical component 20 and the second optical component 30 according to the present embodiment are configured such that the crosstalk of a pump light beam passing second optical component 30 is eliminated at a point in time at which the pump light beam enters the uncoupled MCF 50. In the uncoupled MCF 50, a core 51 is doped with a rare earth element (e.g. erbium), and the rare earth element amplifies a signal light beam with a pump light beam from the first optical component 20 when a signal light beam from the second optical component 30 propagates.

The second optical component 30 includes a second uncoupled MCF 30A having small optical coupling between the cores and a second coupled MCF 30B located between the second uncoupled MCF 30A and the spatial joining part 40. The second uncoupled MCF 30A and the second coupled MCF 30B are fusion-spliced to each other, for example. A core-outer-circumference-to-core-outer-circumference distance C3 of the second uncoupled MCF 30A is almost the same as the core-outer-circumference-to-core-outer-circumference distance of the uncoupled MCF 50, for example. In the second coupled MCF 30B, in the comparison with the second uncoupled MCF 30A, the core-outer-circumference-to-core-outer-circumference distance C3 is narrowed.

The configuration of the second uncoupled MCF 30A is similar to the configuration of the first uncoupled MCF 20A, for example, and includes cores 31A and a cladding 31B similar to the cores 21A and the cladding 21B. Since the refractive index of the core 31A is higher than the refractive index of the cladding 31B, a signal light beam and a pump light beam propagate in the inside of the cores 31A. At the end part of the second uncoupled MCF 30A at the second coupled MCF 30B side, i.e., the fusion-spliced part of the second uncoupled MCF 30A to the second coupled MCF 30B, an MFD converting part 35 is provided. The configuration of the MFD converting part 35 is similar to the configurations of the MFD converting parts 15 and 25, for example. In the MFD converting part 35, the core-outer-circumference-to-core-outer-circumference distance C3 between the cores 31A is narrowed as the cores 31A go toward the tip end face 30c, and the diameters of the cores 31A are expanded as the cores 31A go toward the tip end face 30c.

Similarly to the description above, the second coupled MCF 30B includes cores 32A including a center core and outer cores and a cladding 32B covering a plurality of cores 32A. A core-outer-circumference-to-core-outer-circumference distance C3 of the second coupled MCF 30B is shorter than the core-outer-circumference-to-core-outer-circumference distance C3 of the second uncoupled MCF 30A; for example, the core-outer-circumference-to-core-outer-circumference distance C3 of the MFD converting part 35 is shorter as the cores go from the second uncoupled MCF 30A toward the second coupled MCF 30B.

The core-outer-circumference-to-core-outer-circumference distance C3 of the second coupled MCF 30B is constant along a length direction D2 of the second coupled MCF 30B (the optical axis direction of the second optical component 30). For example, at a tip end face 30d of the second coupled MCF 30B on the spatial joining part 40 side, the diameters of the cores 32A are almost the same as the diameters of the cores 31A at the part of the tip end face 30c. In the comparison with the core 31A, the diameter of the core 32A at the tip end face 30d is expanded, and thus the MFD is increased, and the second optical component 30 has a configuration resistant to offsets.

Figure 3:
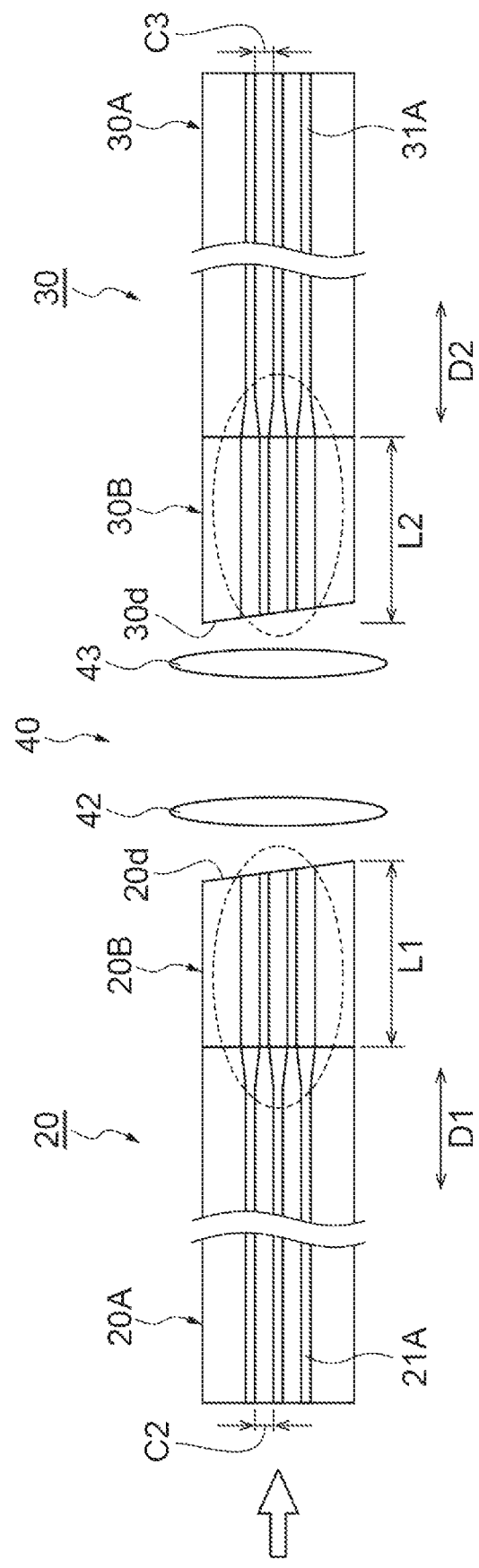
FIG. 3 is a view schematically showing the first optical component, the spatial joining part, and the second optical component of the optical module in FIG. 1.

FIG. 3 is a simplified view showing the first optical component 20 and the second optical component 30 according to an exemplary modification. As shown in FIG. 3, for example, the tip end face 20d of the first optical component 20 (first coupled MCF 20B) on the spatial joining part 40 side and the tip end face 30d of the second optical component 30 (the second coupled MCF 30B) on the spatial joining part 40 side may be both inclined. In this case, the normal of the tip end face 20d is inclined from the length direction D1, and the normal of the tip end face 30d is inclined from the length direction D2. Thus, it is possible to suppress a reflection return light beam between the first optical component 20 and the second optical component 30, and this improves the quality of optical signals.

Meanwhile, in the first coupled MCF 20B of the first optical component 20, since the core-outer-circumference-to-core-outer-circumference distance C2 is shorter in the first uncoupled MCF 20A as described above, crosstalk is produced in the part where the core-outer-circumference-to-core-outer-circumference distance C2 is short (e.g. broken-line parts in FIG. 3), the crosstalk in which pump light beams interfere with each other between adjacent cores. In the present embodiment, the crosstalk having been produced in the first coupled MCF 20B is eliminated in the second coupled MCF 30B of the second optical component 30.

Specifically, crosstalk is periodically produced along the length directions D1 and D2. To this, in the present embodiment, the total of a length L1 along the length direction D1 of the first coupled MCF 20B and a length L2 along the length direction D2 of the second coupled MCF 30B is adjusted to a length L in which crosstalk is suppressed, and thus the crosstalk is eliminated in the second coupled MCF 30B. Therefore, even though crosstalk is produced in the first coupled MCF 20B, it is possible to align the power of the pump light beam entered to the cores 21A of the first uncoupled MCF 20A with the power of the pump light beam emitted from the cores 31A of the second uncoupled MCF 30A. Accordingly, it is possible to align the power of the pump light beam entered to the cores 51 of the uncoupled MCF 50, and thus this enables the improvement of the quality of optical signals.

Next, the length L in which crosstalk is suppressed is an example of will be described. For example, the transmission distance of the MCF that is a seven-core optical fiber is z, the coupling of the core mode of the center core of the MCF (coupling from the center core to the center core) is $P_{00}(z)$, the coupling of the core mode of the outer core of the MCF (the coupling of the outer core i to the outer core i) is $P_{ii}(z)$, and the coupling coefficient is k, and then $P_{00}(z)$ and $P_{ii}(z)$ are expressed by Expression (1) and Expression (2) below.

[Math. 1]

$$P_{00}(z) = \frac{4}{7} + \frac{3}{7} \cdot \cos(2\sqrt{7} \cdot k \cdot z) \tag{1}$$

[Math. 2]

$$P_{ii}(z) = \tag{2}$$
$$\frac{c^4 + s^4}{36} + \frac{1}{4} + \frac{c^2 s^2}{18} \cdot \cos(2\sqrt{7} \cdot k \cdot z) + \frac{s^2}{18} \cdot \cos\{(3 - \sqrt{7}) \cdot k \cdot z\} +$$
$$\frac{s^2}{9} \cdot \cos\{(2 - \sqrt{7}) \cdot k \cdot z\} + \frac{s^3}{9} \cdot \cos(\sqrt{7} \cdot k \cdot z) +$$
$$\frac{c^2}{18} \cdot \cos\{(3 + \sqrt{7}) \cdot k \cdot z\} + \frac{c^2}{9} \cdot \cos\{(2 + \sqrt{7}) \cdot k \cdot z\} +$$
$$\frac{c^2}{9} \cdot \cos(\sqrt{7} \cdot k \cdot z) + \frac{1}{9} \cdot \cos(3 \cdot k \cdot z) + \frac{2}{9} \cdot \cos(2 \cdot k \cdot z) + \frac{1}{9} \cdot \cos(k \cdot z)$$

Note that c and s satisfy Expression (3) and Expression (4) below.

[Math. 3]

$$c^2 = \frac{1}{2} \cdot \left[1 - \frac{1}{\sqrt{7}}\right] \tag{3}$$

[Math. 4]

$$s^2 = \frac{1}{2} \cdot \left[1 + \frac{1}{\sqrt{7}}\right] \tag{4}$$

The refractive index difference (the refractive index difference between the core and the cladding) of the MCF that is a seven-core optical fiber is Δ, the core radius is a, the core-to-core distance is d, and the normalized frequency is v, and then the coupling coefficient k is expressed by Expression (5) described later.

[Math. 5]

$$k = \frac{u^2}{a \cdot v^3 \cdot K_1^2(w)} \cdot \left[\frac{\pi \cdot a \cdot \Delta}{w \cdot d}\right]^{\frac{1}{2}} \cdot e^{\left(-\frac{w \cdot d}{a}\right)} \tag{5}$$

The refractive index of the core is n and the wavelength is λ, and then the normalized frequencies v, u, and w are expressed by Expression (6) and Expression (7) below.

[Math. 6]

$$v = \frac{2\pi \cdot n \cdot a}{\lambda} \cdot \sqrt{2\Delta} \tag{6}$$

[Math. 7]

$$u^2 + w^2 = v^2 \tag{7}$$

The values of u and w are calculated as values satisfying Expression (8) below. Note that $K_1(x)$ is a modified Bessel function and $J_1(x)$ is a Bessel function.

[Math. 8]

$$\frac{J_0(u)}{u \cdot J_1(u)} = \frac{K_0(w)}{w \cdot K_1(w)} \tag{8}$$

In Expression (1) and Expression (2) described above, for example, the length of the transmission distance z of the MCF in which the coupling $P_{00}(z)$ of the core mode of the center core of the MCF and the coupling $P_0(z)$ of the core mode of the outer core of the MCF are both 0.8 or more is the length L in which crosstalk is suppressed. As described above, since $P_{00}(z)$ and $P_0(z)$ are cosine functions, the value of z that is the length L periodically appears.

Figure 4:
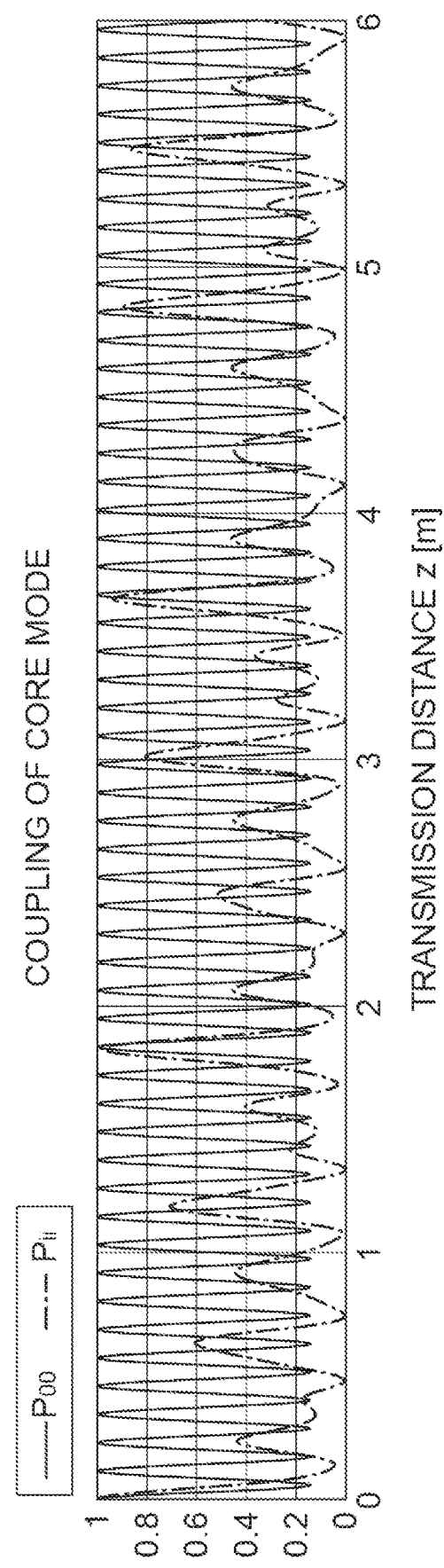
FIG. 4 is a graph showing an example of the relationship between the transmission distance and the coupling of core modes in a coupled MCF.

FIG. 4 is a graph showing an example of the relationship between $P_{00}(z)$ and $P_0(z)$ and the transmission distance z. This graph is an example in the case in which the wavelength λ is 0.98 μm, the core radius a is 3.5 μm, the refractive index difference Δ is 0.188%, the normalized frequency v is 2.00, the value of u is 1.53, and the value of w is 1.29. As exemplified in FIG. 4, the minimum value of the transmission distance z where the values of $P_{00}(z)$ and $P_0(z)$ both exceed 0.8 is 1.82 m or more and 1.85 m or less. Therefore, when the length L that is the total of the length L1 of the first coupled MCF 20B and the length L2 of the second coupled MCF 30B is 1.82 m or more and 1.85 in or less, crosstalk is suppressed.

Figure 5:
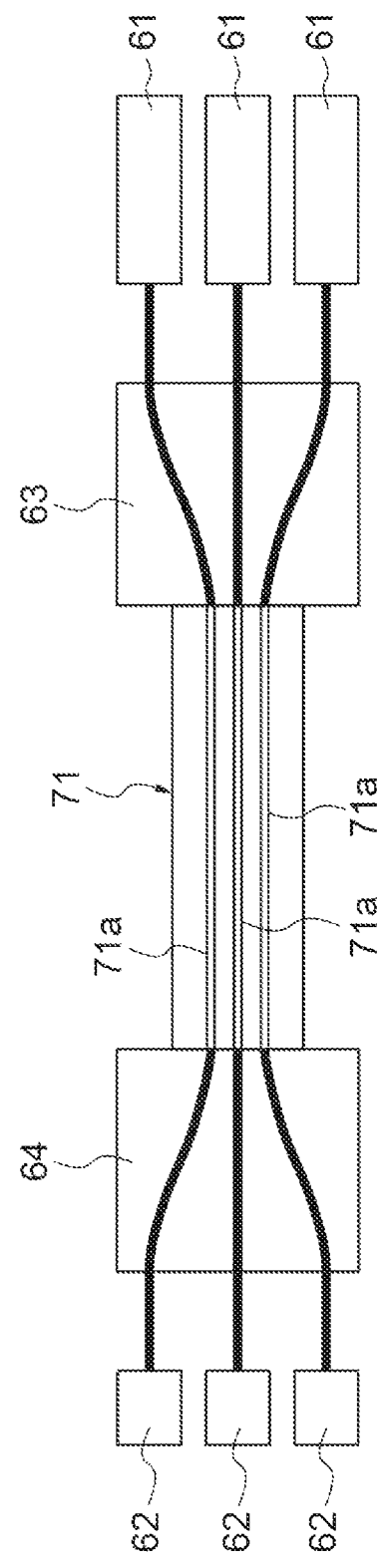
FIG. 5 is a view showing an example of one step of a method for manufacturing an optical module according to the first embodiment.

A manufacturing method for the optical module 1 including the first coupled MCF 20B and the second coupled MCF 30B thus configured will be described with reference to FIGS. 5 to 7. First, as shown in FIG. 5, a plurality of pump lasers 61 and a plurality of monitor PDs (Photo Diode) 62 (e.g. in the same number as the number of cores), a connector component (the fan-in fan-out device: FI/FO) 63 that leads optical signals from the pump lasers 61 to the cores, and connector component 64 that leads optical signals from the cores to the monitor PDs 62 are prepared.

An uncoupled MCF 71 that forms the first optical component 20 and the second optical component 30 is then prepared. Through the connector component 63, cores 71a of the uncoupled MCF 71 are optically coupled to the pump lasers 61, and the cores 71a are optically coupled to the monitor PDs 62 through the connector component 64. The pump lasers 61 are lit one by one, and the initial power is measured by the monitor PDs 62.

Figure 6:
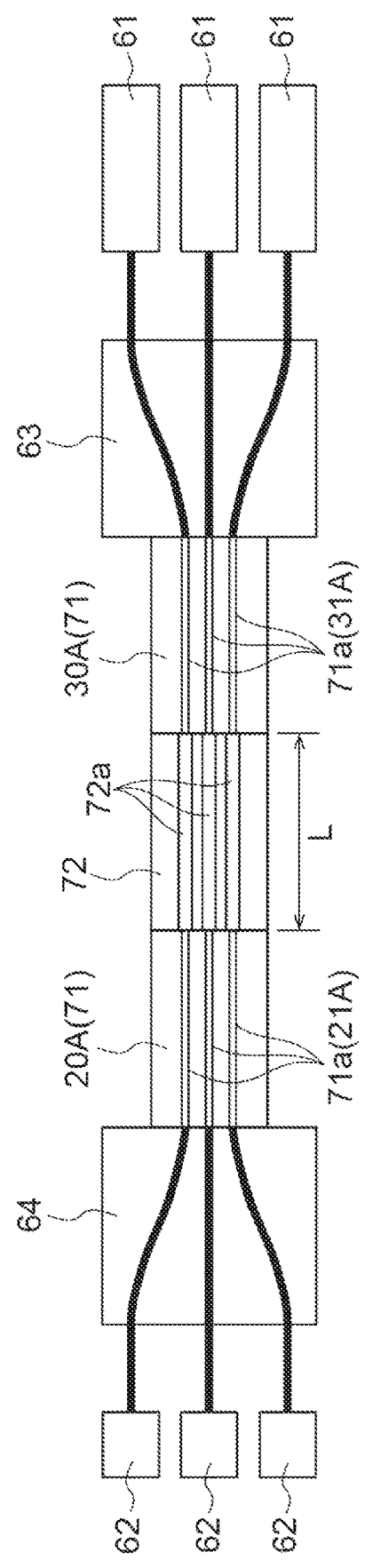
FIG. 6 is a view showing an example of the subsequent step of the manufacturing method in FIG. 5.

As shown in FIGS. 5 and 6, the uncoupled MCF 71 is cut in the intersecting direction of the optical axis of the core 71a, and the first uncoupled MCF 20A and the second uncoupled MCF 30A is prepared (the step of preparing the first uncoupled MCF and the second uncoupled MCF). At this time, one side of the cut uncoupled MCF 71 is the first uncoupled MCF 20A, and the other side of the cut uncoupled MCF 71 is the second uncoupled MCF 30A.

A coupled MCF 72 adjusted in the length L in which crosstalk is suppressed is prepared, and the coupled MCF 72 is inserted between the first uncoupled MCF 20A and the second uncoupled MCF 30A. The coupled MCF 72 has cores 72a whose diameter is larger than the cores 71a of the uncoupled MCF 71. One end of the coupled MCF 72 is fusion-spliced to the first uncoupled MCF 20A and the other end of the coupled MCF 72 is fusion-spliced to the second uncoupled MCF 30A (the step of fusion-splicing the coupled MCF). For example, the length L of the coupled MCF 72 is 1.82 m that is lower limit because the core expansion part is increased when heated in the steps described later.

Figure 7:
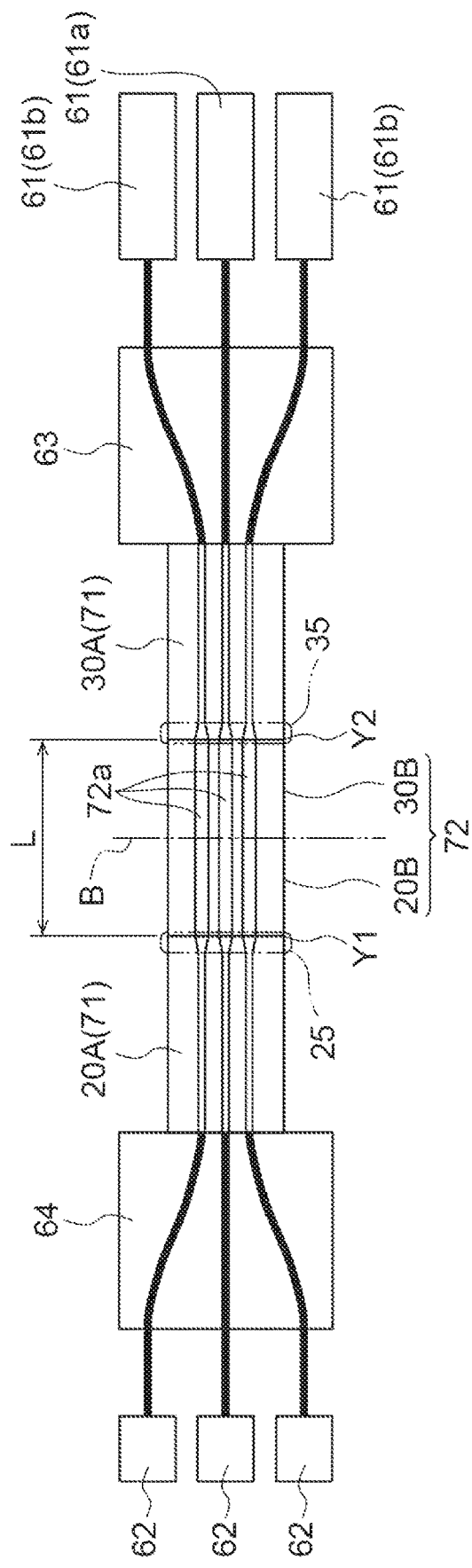
FIG. 7 is a view showing an example of the subsequent step of the manufacturing method in FIG. 6.

As shown in FIGS. 6 and 7, a fusion-spliced part Y1 of the coupled MCF 72 to the first uncoupled MCF 20A and a fusion-spliced part Y2 of the coupled MCF 72 to the second uncoupled MCF 30A are heated to form the MFD converting parts 25 and 35 is formed, and the MFDs of the fusion-spliced parts Y1 and U2 are aligned. This heating is performed using a gas burner, for example. In heating the fusion-spliced parts Y1 and Y2, for example, the pump laser 61a connected to the center core is lit, and heating is performed until a reduction in losses reaches the limit. Heating the fusion-spliced parts Y1 and Y2 may be performed in which for example, the fusion-spliced part Y1 is heated, then the fusion-spliced part Y2 is heated, the pump laser 61a for the center core and the pump lasers 61b for the outer cores are alternately lit, power is monitored from the viewpoint of a reduction in losses as well as the viewpoint of crosstalk, and heating may be performed until a reduction in crosstalk reaches the limit.

As described above, after the fusion-spliced parts Y1 and Y2 are heated, the coupled MCF 72 is split along a split line B, and the first coupled MCF 20B and the second coupled MCF 30B are prepared (the step of preparing the first coupled MCF and the second coupled MCF). Note that although the position of the split line B is the center in the length direction of the coupled MCF 72, for example, the position is appropriately changeable. As shown in FIG. 1, the spatial joining part 40 is optically coupled between the first coupled MCF 20B and the second coupled MCF 30B, the coupled MCF 10 is optically coupled, and then the manufacture of the optical module 1 is completed.

Next, the operation and effect of the method for manufacturing the optical module 1, and the optical module 1 according to the present embodiment will be described in detail. In the optical module 1, the first optical component 20 includes the first uncoupled MCF 20A and the first coupled MCF 20B, and the second optical component 30 includes the second uncoupled MCF 30A and the second coupled MCF 30B. The spatial joining part 40 optically couples the first optical component 20 to the second optical component 30.

The first coupled MCF 20B is located between the first uncoupled MCF 20A and the spatial joining part 40, and the second coupled MCF 30B is located between the second uncoupled MCF 30A and the spatial joining part 40. The first coupled MCF 20B is optically coupled to the second coupled MCF 30B are through the spatial joining part 40. At the tip end face 20d of the first coupled MCF 20B on the spatial joining part 40 side and the tip end face 30d of the second coupled MCF 30B on the spatial joining part 40 side, the MFDs are both expanded. Therefore, it is possible to reduce optical connection losses with resistance to offsets, and it is possible to relieve manufacture tolerance in the offset direction (in the direction intersecting with the optical axis).

In the first coupled MCF 20B and the second coupled MCF 30B, crosstalk is periodically produced along the length directions D1 and D2 of the MCFs. However, the total of the length L1 of the first coupled MCF 20B and the length L2 of the second coupled MCF 30B is adjusted in the length L in which crosstalk is suppressed, and thus light emission is enabled to the amplification uncoupled MCF 50 in the state in which the bias of the light beam among a plurality of cores is suppressed. Therefore, it is possible to suppress variations each core in the intensity of the pump light beam used for amplifying the light beam, and thus the efficient amplification of the light beam is enabled, and the improvement of the quality of optical communication is enabled.

In the optical module 1, the core diameter of the first coupled MCF 20B is larger than the core diameter of the first uncoupled MCF 20A, and the core diameter of the second coupled MCF 30B is larger than the core diameter of the second uncoupled MCF 30A. Accordingly, it is possible to easily form the part in which the MFDs are increased.

In the method for manufacturing the optical module 1, the uncoupled MCF 71 is cut to prepare the first uncoupled MCF 20A and the second uncoupled MCF 30A, and the coupled MCF 72 having the length L is fusion-spliced between the first uncoupled MCF 20A and the second uncoupled MCF 30A. The coupled MCF 72 is then split to prepare the first coupled MCF 20B and the second coupled MCF 30B, and thus it is possible to easily manufacture the optical module 1. Therefore, it is possible to easily manufacture the optical module 1 including the first coupled MCF 20B and the second coupled MCF 30B having the length L in which crosstalk is suppressed.

In the method for manufacturing the optical module 1 described above, an example is described in which the coupled MCF 72 is fusion-spliced between the first uncoupled MCF 20A and the second uncoupled MCF 30A. However, the method for manufacturing the optical module 1 is not limited to the example. In the following, an exemplary modification of the method for manufacturing the optical module 1 will be described.

For example, a configuration may be provided in which as shown in FIGS. 5 and 7, the uncoupled MCF 71 is inserted between the connector component 63 and the connector component 64, the uncoupled MCF 71 is heated by the length L, and the coupled MCF 72 is formed by heating. In this case, the coupled MCF 72 does not have to be prepared as a member separated from the uncoupled MCF 71, and the coupled MCF 72 having the length L is obtained by heating the uncoupled MCF 71. After the coupled MCF 72 is obtained by heating the uncoupled MCF 71 by the length L, similarly to the description above, the coupled MCF 72 is split to prepare the first coupled MCF 20B and the second coupled MCF 30B (the step of preparing the first coupled MCF and the second coupled MCF), and after that the manufacture of the optical module 1 is completed.

In the method for manufacturing the optical module 1 according to the exemplary modification, the uncoupled MCF 71 is heated to prepare the coupled MCF 72 between the first uncoupled MCF 20A and the second uncoupled MCF 30A. The coupled MCF 72 is then split to prepare the first coupled MCF 20B and the second coupled MCF 30B, and thus it is possible to easily manufacture the optical module 1. Therefore, similarly to the description above, it is possible to easily manufacture the optical module 1 including the first coupled MCF 20B and the second coupled MCF 30B having the length L in which crosstalk is suppressed.

Second Embodiment

Figure 8:
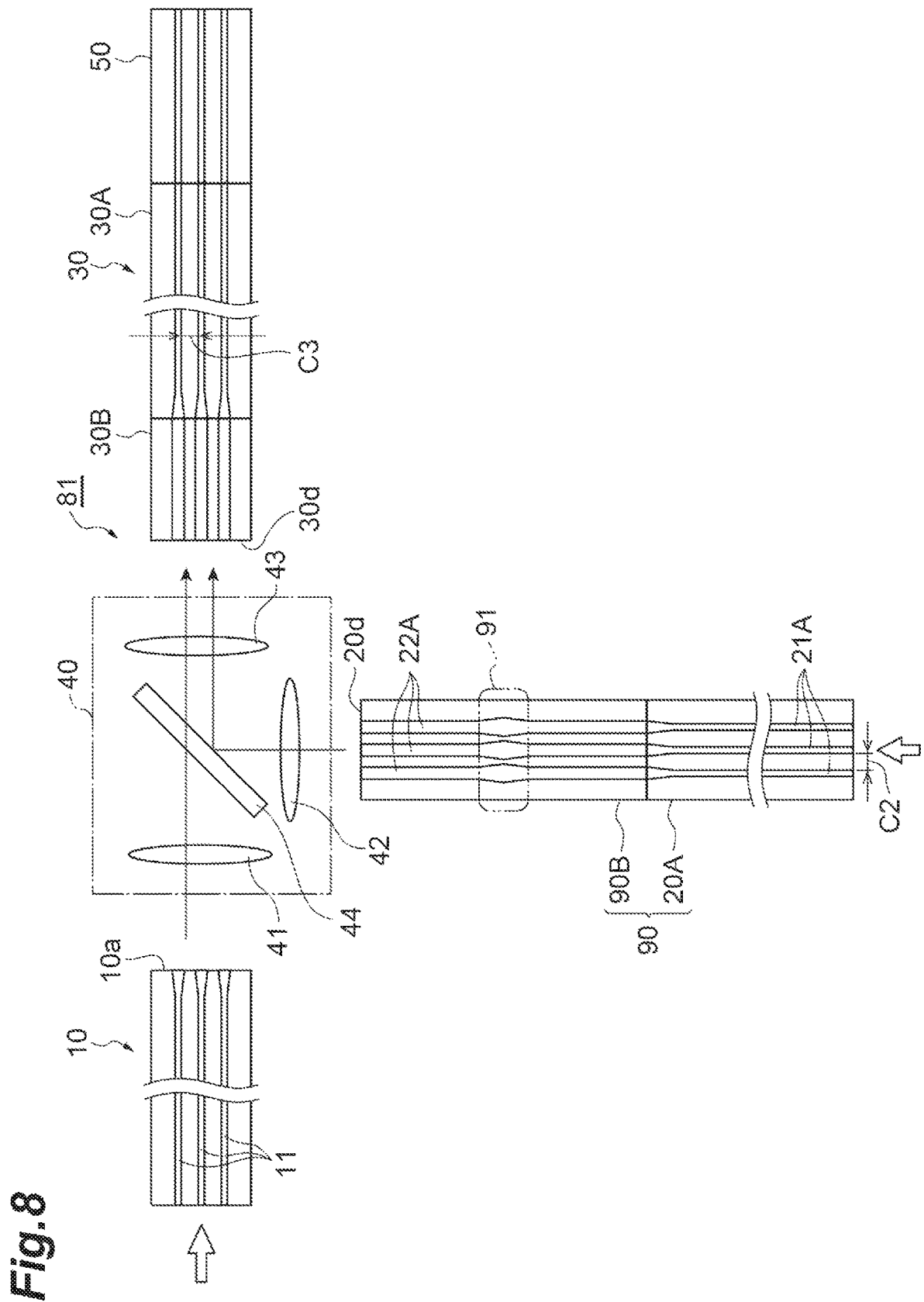
FIG. 8 is a view schematically showing the configuration of an optical module according to a second embodiment.

Next, an optical module 81 according to the second embodiment will be described with reference to FIG. 8. The optical module 81 is different from the first optical component 20 of the first embodiment in that the configuration of a first optical component 90 is different. A first coupled MCF 90B of the first optical component 90 includes a core expansion part 91 in which the diameter is further expanded more than the diameter of a core 22A. Note that instead of the first coupled MCF 90B, the second coupled MCF 30B may include the core expansion part 91. In the following, the duplicate description of the first embodiment is appropriately omitted.

Figure 9:
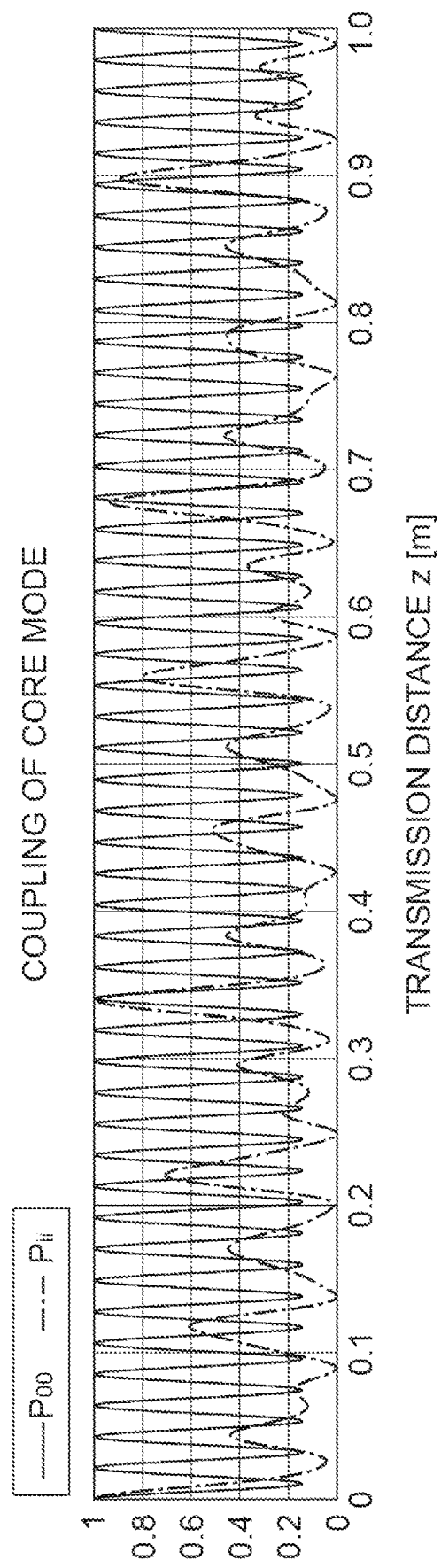
FIG. 9 is a graph showing an example of the relationship between the transmission distance and the coupling of core modes in the core expansion part of the optical module in FIG. 8.

The core expansion part 91 is provided on the individual cores 22A of the first coupled MCF 90B, and the core expansion part 91 is the site where core-to-core coupling is prone to be produced more than in the core 22A. FIG. 9 is a graph showing an example of the relationship between $P_{oo}(z)$ and $P_{ii}(z)$ and the transmission distance z in the core expansion part 91. This graph is an example in the case in which the wavelength λ is 0.98 μm, the core radius a is 5 μm, the refractive index difference Δ is 0.092%, the normalized frequency v is 2.00, the value of u is 1.53, and the value of w is 1.29. As exemplified in FIG. 9, the minimum value of the transmission distance z where the values of $P_{oo}(z)$ and $P_{ii}(z)$ both exceed 0.8 is approximately 0.34 m.

Figure 10:
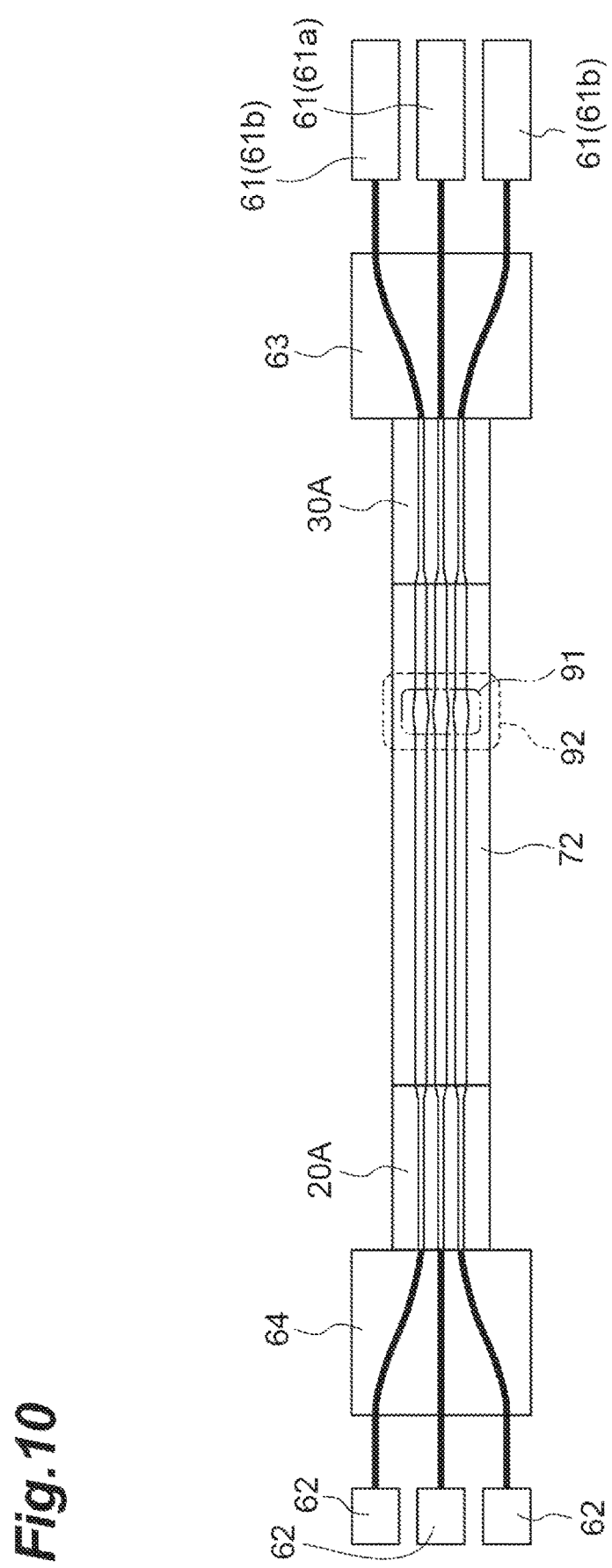
FIG. 10 is a view showing an example of one step of a method for manufacturing an optical module according to the second embodiment.

Next, a manufacturing method for the optical module 81 according to the second embodiment will be described with reference to FIG. 10. In the method for manufacturing the optical module 81, the step of preparing a first uncoupled MCF 20A and a second uncoupled MCF 30A, and the step of fusion-splicing a coupled MCF 72 are similar to the first embodiment. Instead of the step of fusion-splicing the coupled MCF 72, as in the above-described exemplary modification, the coupled MCF 72 may be prepared by heating.

As described above, after the coupled MCF 72 is formed between the first uncoupled MCF 20A and the second uncoupled MCF 30A, a coating is removed at a site 92 close to the second uncoupled MCF 30A, for example, the site 92 where the coating is removed is heated to form the core expansion part 91. At this time, a pump laser 61a for the center core and a pump laser 61b for the outer cores are alternately lit, similarly to the description above, power is monitored, for example, by monitor PDs 62, and then heating is ended. Similarly to the description above, as shown in FIG. 8, after the coupled MCF 72 is split to prepare the first coupled MCF 90B and the second coupled MCF 30B, the spatial joining part 40 is disposed, the coupled MCF 10 is disposed, and a series of steps is completed.

As described above, in the optical module 81 according to the second embodiment, at least any one of the first coupled MCF 90B and the second coupled MCF 30B has the core expansion part 91 in which the core diameter is further expanded. In the core expansion part 91, the core-outer-circumference-to-core-outer-circumference distance C2 (or the core-outer-circumference-to-core-outer-circumference distance C3) is further narrowed, and thus it is possible to more easily produce crosstalk. Therefore, the length of the core expansion part 91 of the first coupled MCF 90B or the second coupled MCF 30B is adjusted, and thus it is possible to easily adjust the length L in which crosstalk is suppressed. Specifically, in the first embodiment, for example, the coupled MCF 72 having a length of approximately 1.82 m has to be prepared. To this, in the second embodiment, the length of the coupled MCF 72 to be prepared is made shorter than 1.82 m more or less, adjustment of the length L is enabled in forming the core expansion part 91 later, and easy manufacture is enabled.

Figure 11:
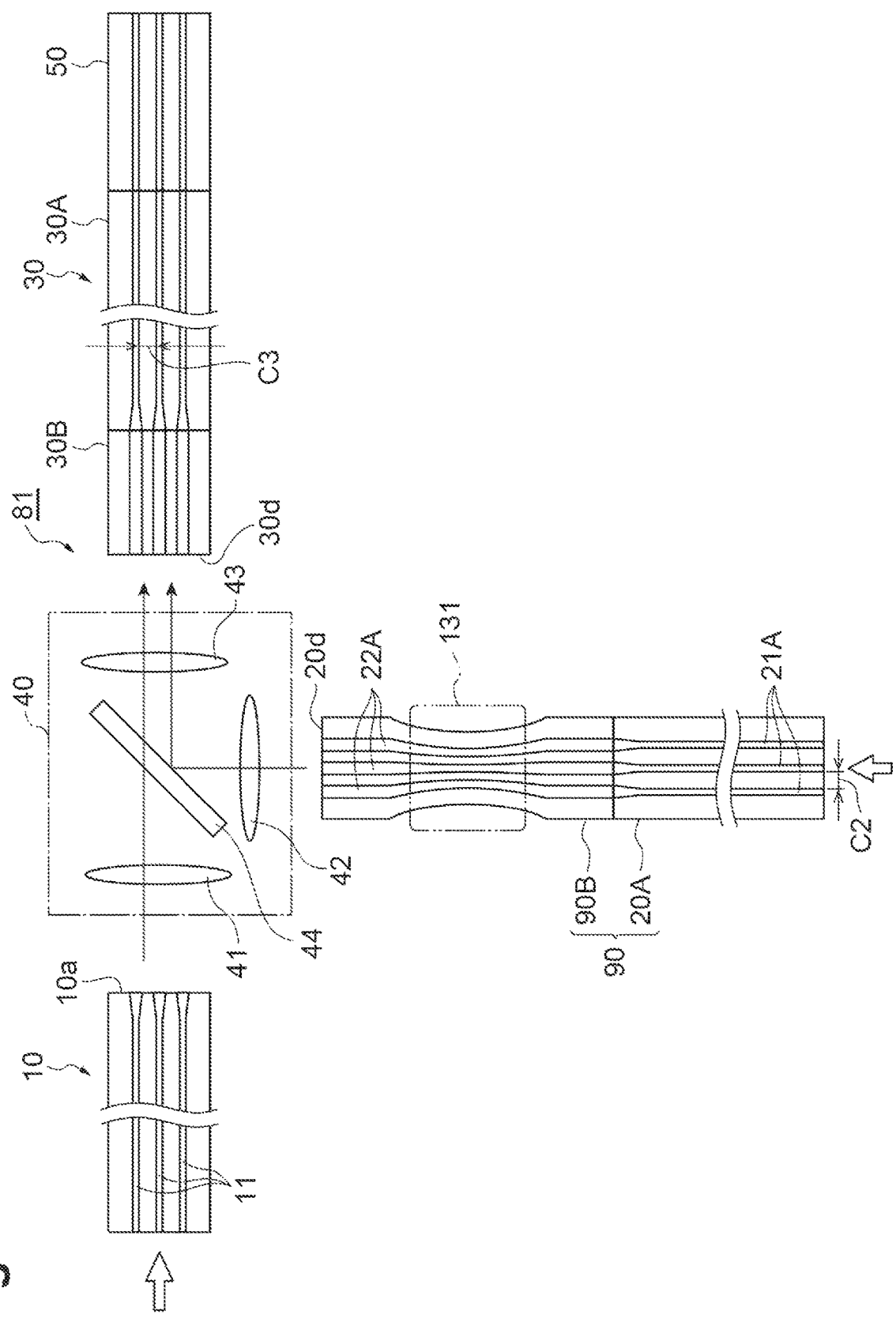
FIG. 11 is a view showing the exemplary modification of the optical module in FIG. 8.
Figure 12:
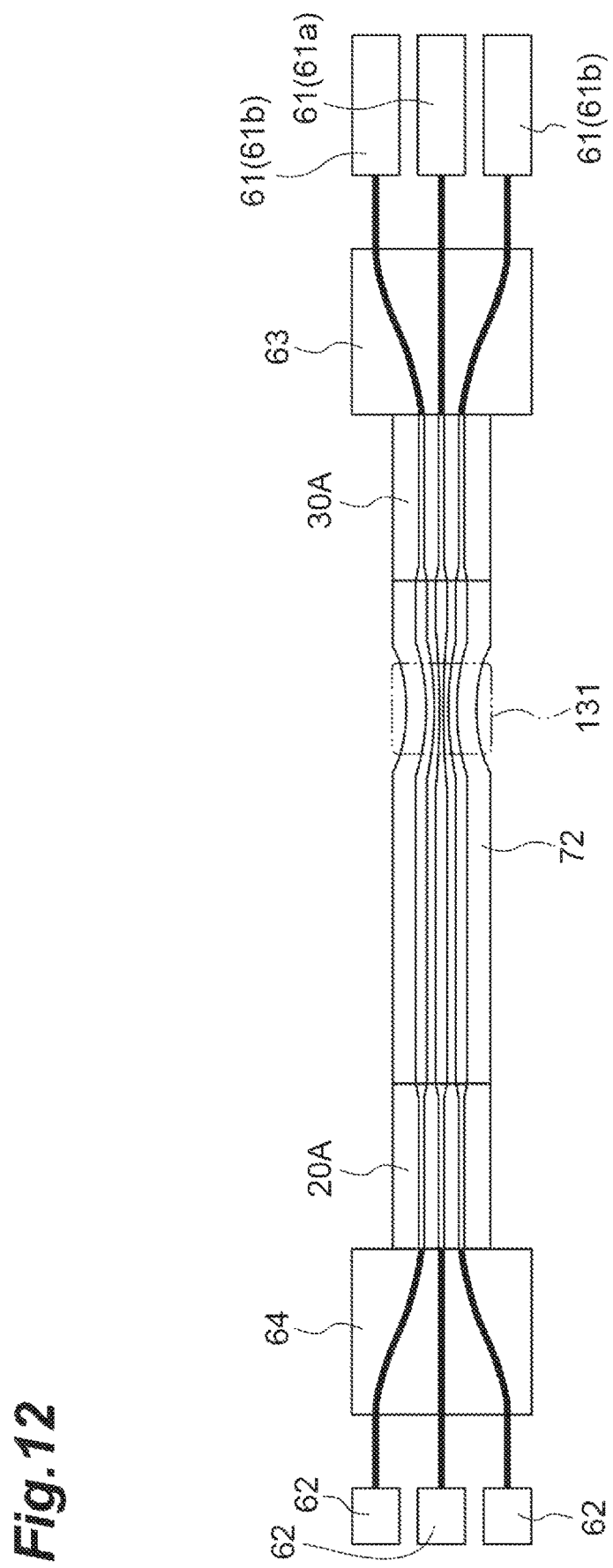
FIG. 12 is a view showing the exemplary modification of the manufacturing method in FIG. 10.

FIG. 11 is a view showing an exemplary modification of the optical module 81. FIG. 12 is a view showing an exemplary modification of the manufacturing method for the optical module 81. As shown in FIGS. 11 and 12, instead of the core expansion part 91, the optical module 81 may include a structure obtained in which the coupled MCF 72 is extended to form a diameter shrinking part 131. In this case, in the diameter shrinking part 131, in the comparison with the unshrunk portion other than the diameter shrinking part 131, optical coupling between the cores 22A is further increased, and thus it is possible to easily adjust the above-described length L. Therefore, the effect similar to the description above is obtained.

Third Embodiment

Figure 13:
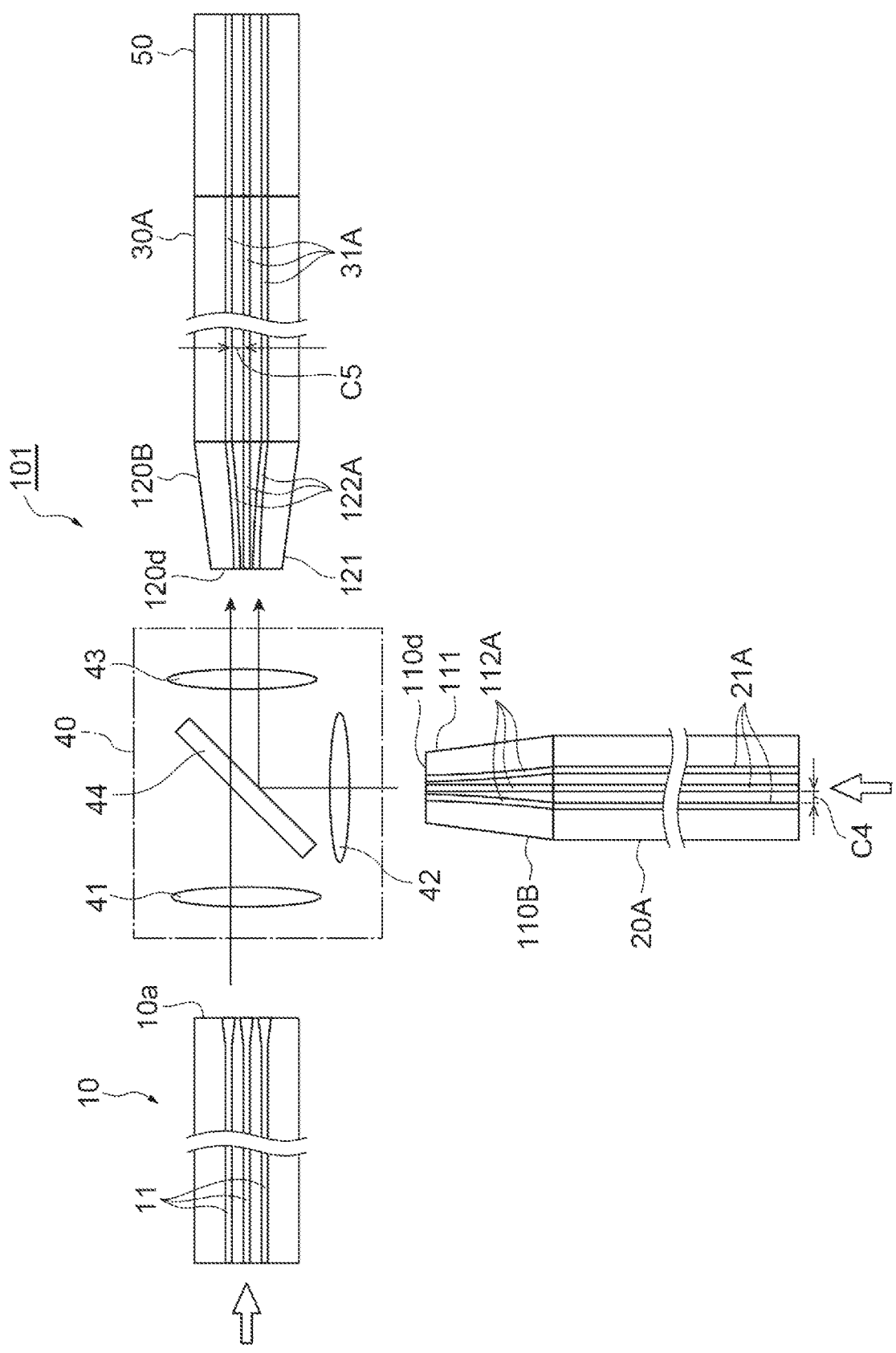
FIG. 13 is a view schematically showing the configuration of an optical module according to a third embodiment.
Figure 14:
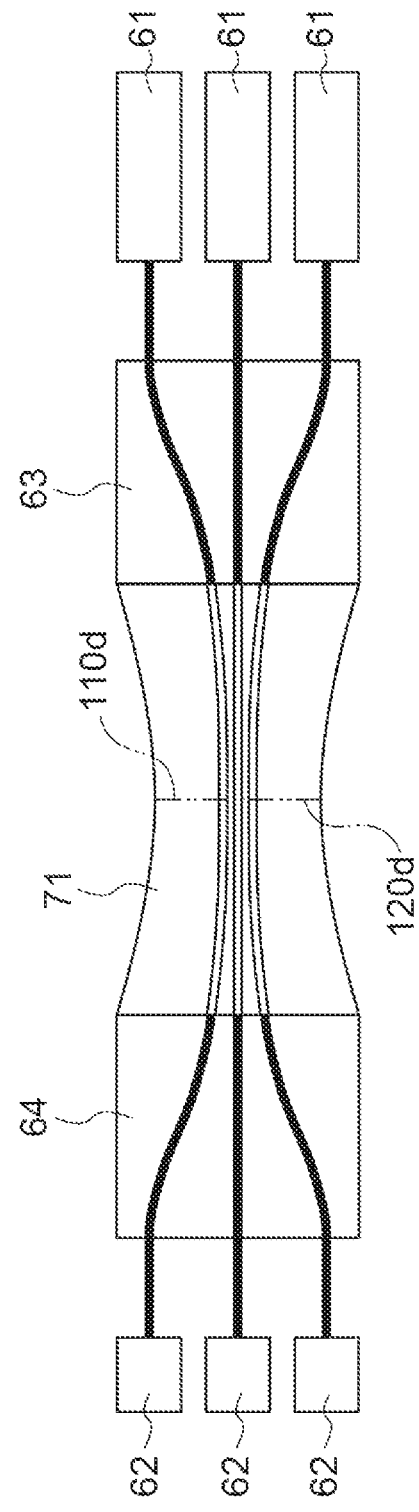
FIG. 14 is a view showing an example of one step of a method for manufacturing an optical module according to the third embodiment.

Next, an optical module 101 according to a third embodiment and a manufacturing method for the optical module 101 will be described with reference to FIGS. 13 and 14. As shown in FIG. 13, in the optical module 101, the configurations of a first coupled MCF 110B and a second coupled MCF 120B are different from the foregoing embodiments.

The outer diameter (diameter) of the first coupled MCF 110B is gradually decreased as the first coupled MCF 110B goes from the first uncoupled MCF 20A toward a spatial joining part 40. The outer diameter of the second coupled MCF 120B is also gradually decreased as the second coupled MCF 120B goes from the second uncoupled MCF 30A toward the spatial joining part 40. Therefore, a diameter shrinking part 111 is formed at an end part 110d of the first coupled MCF 110B on the spatial joining part 40 side, and a diameter shrinking part 121 is formed at an end part 120d of the second coupled MCF 120B on the spatial joining part 40 side. By the diameter shrinking parts 111 and 121, the core diameter and the core-center-axis-to-core-center-axis distance of the core 112A and the core diameter and the core-center-axis-to-core-center-axis distance of the core 122A are narrowed as the cores 112A and the cores 122A go toward the spatial joining part 40. Therefore, in the first coupled MCF 110B and the second coupled MCF 120B, crosstalk is produced, and the MFDs are increased at the end faces 110d and 120d.

Next, a manufacturing method for the optical module 101 according to the third embodiment will be described with reference to FIG. 12. In the method for manufacturing the optical module 101 according to the third embodiment, an uncoupled MCF 71 is disposed similarly to the description above, the uncoupled MCF 71 extends in the length direction while the uncoupled MCF 71 is being heated. The heating and extension of the uncoupled MCF 71 reduces the outer diameter of the uncoupled MCF 71 to form the diameter shrinking parts 111 and 121. Similarly to the description above, monitoring is performed using pump lasers 61 and monitor PDs 62, and then heating and extension is ended, split is performed to prepare the first coupled MCF 110B and the second coupled MCF 120B is prepared, and then a series of steps is completed.

As shown in FIG. 13, in the optical module 101 and the method for manufacturing the optical module 101 according to the third embodiment, the first coupled MCF 110B and the second coupled MCF 120B have the diameter shrinking parts 111 and 121 in which the outer diameters are decreased as the cores are apart from the first uncoupled MCF 20A and the second uncoupled MCF 30A. Therefore, in the diameter shrinking parts 111 and 121, the core diameter and the core-center-axis-to-core-center-axis distance are narrowed, and thus it is possible to prepare the first coupled MCF 110B and the second coupled MCF 120B with no increase in the type of the MCF to be prepared, and it is possible to increase the MFDs at the end faces 110d and 120d. It is possible to easily form the diameter shrinking parts 111 and 121 by pulling the MCFs in the length direction by heating and extension, for example.

As described above, the embodiments according to the present disclosure are described. However, the present invention is not limited to the foregoing embodiments and the foregoing examples, and various modifications are possible within the scope not deviating from the gist described in claims. That is, the shapes, sizes, materials, numbers, and disposition forms of the components of the optical module, and the contents and orders of the steps of the method for manufacturing the optical module are appropriately changeable within the scope not deviating from the gist. For example, in the foregoing embodiments, the spatial joining part 40 including the collimating lenses 41, 42, and 43 and the bandpass filter 44 is described. However, the configuration of the spatial joining part is not limited to the configuration of the spatial joining part 40, which is appropriately changeable.

REFERENCE SIGNS LIST 1, 81, 101 optical module
coupled MCF
10a tip end face
11 core
11a center core
11b outer core
12 cladding
15, 25, 35 MFD converting part
20, 90 first optical component
20A first uncoupled MCF
20B, 90B, 110B first coupled MCF
20c, 20d, 30c, 30d tip end face
21A, 22A, 31A, 32A, 122A core
21B, 22B, 31B, 32B cladding
30 second optical component
30A second uncoupled MCF
30B, 120B second coupled MCF
40 spatial joining part
41, 42, 43 collimating lens
44 bandpass filter
50 uncoupled MCF
51 core
61 pump laser
62 monitor PD
63, 64 connector parts
71 uncoupled MCF
71a, 72a core
91 core expansion part
110d, 120d end part
121, 131 diameter shrinking part
B split line
C1, C2, C3 core-outer-circumference-to-core-outer-circumference distance
D1, D2 length direction
Y1, Y2 fusion-spliced part.

The invention claimed is:

1. An optical module comprising:
a first optical component and a second optical component including a multicore fiber (MCF); and
a spatial joining part configured to optically couple the first optical component to the second optical component, wherein
the first optical component includes a first uncoupled MCF and a first coupled MCF, the first uncoupled MCF having small optical coupling between cores, the first coupled MCF being located between the first uncoupled MCF and the spatial joining part, the first coupled MCF having a mode field diameter (MFD) larger than a MFD of the first uncoupled MCF,
the second optical component includes a second uncoupled MCF and a second coupled MCF, the second uncoupled MCF having small optical coupling between cores, the second coupled MCF being located between the second uncoupled MCF and the spatial joining part, the second coupled MCF having an MFD larger than an MFD of the second uncoupled MCF,
in the first coupled MCF and the second coupled MCF, crosstalk is periodically produced along length directions of the MCFs, and
in the spatial joining part in which a large crosstalk is produced from the first coupled MCF, a total of a length of the first coupled MCF and a length of the second coupled MCF is length L in which the crosstalk is suppressed.

2. The optical module according to claim 1, wherein
a core diameter of the first coupled MCF is larger than a core diameter of the first uncoupled MCF, and
a core diameter of the second coupled MCF is larger than a core diameter of the second uncoupled MCF.

3. The optical module according to claim 2, wherein at least any one of the first coupled MCF and the second coupled MCF has a core expansion part in which a core diameter is further expanded.

4. The optical module according to claim 3, wherein the core expansion part is provided at a position apart from the spatial joining part.

5. The optical module according to claim 2, wherein at least any one of the first coupled MCF and the second coupled MCF has a diameter shrinking part in which an outer diameter is decreased.

6. The optical module according to claim 1, wherein the first coupled MCF and the second coupled MCF have a diameter shrinking part in which an outer diameter is decreased as apart from the first uncoupled MCF and the second uncoupled MCF.

7. The optical module according to claim 1, wherein a transmission distance of an MCF that is a seven-core optical fiber is z, coupling of a core mode of a center core of the MCF (coupling from a center core to a center core) is $P_{00}(z)$, coupling of a core mode of an outer core of the MCF (coupling of an outer core i to an outer core i) is $P_{ii}(z)$, and a coupling coefficient is k, and then $P_{00}(z)$ and $P_{ii}(z)$ are expressed by Expression (1) and Expression (2) below, respectively, $$P_{00}(z) = \frac{4}{7} + \frac{3}{7} \cdot \cos(2\sqrt{7} \cdot k \cdot z) \quad (1)$$

$$P_{ii}(z) = \frac{c^4 + s^4}{36} + \frac{1}{4} + \frac{c^2 s^2}{18} \cdot \cos(2\sqrt{7} \cdot k \cdot z) + \quad (2)$$
$$\frac{s^2}{18} \cdot \cos\{(3 - \sqrt{7}) \cdot k \cdot z\} + \frac{s^2}{9} \cdot \cos\{(2 - \sqrt{7}) \cdot k \cdot z\} +$$
$$\frac{s^2}{9} \cdot \cos(\sqrt{7} \cdot k \cdot z) + \frac{c^2}{18} \cdot \cos\{(3 + \sqrt{7}) \cdot k \cdot z\} +$$
$$\frac{c^2}{9} \cdot \cos\{(2 + \sqrt{7}) \cdot k \cdot z\} + \frac{c^2}{9} \cdot \cos(\sqrt{7} \cdot k \cdot z) +$$
$$\frac{1}{9} \cdot \cos(3 \cdot k \cdot z) + \frac{2}{9} \cdot \cos(2 \cdot k \cdot z) + \frac{1}{9} \cdot \cos(k \cdot z), \text{ and}$$

in Expression (1) and Expression (2), a length L in which the crosstalk is suppressed is a length of the transmission distance z of an MCF in which coupling $P_{00}(z)$ of a core mode of a center core of the MCF and coupling $P_{ii}(z)$ of a core mode of an outer core of the MCF are both 0.8 or more.

* * * * *